United States Patent
Blanford

(10) Patent No.: US 7,314,175 B1
(45) Date of Patent: Jan. 1, 2008

(54) METHODS AND APPARATUS FOR IMPROVED USE OF PARTIAL BAR CODE INFORMATION TO DECODE A COMPLETE BAR CODE

(75) Inventor: Denis Michael Blanford, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/613,254

(22) Filed: Dec. 20, 2006

(51) Int. Cl.
G06K 5/04 (2006.01)
G06K 7/10 (2006.01)
G06K 9/00 (2006.01)

(52) U.S. Cl. .................. 235/462.12; 235/462.32; 235/462.36; 235/462.38; 235/462.39

(58) Field of Classification Search .......... 235/462.12, 235/32, 33, 36, 38, 39
See application file for complete search history.

(56) References Cited

U.S. PATENT DOCUMENTS

| | | | | |
|---|---|---|---|---|
| 5,241,164 A | * | 8/1993 | Pavlidis et al. | 235/462.12 |
| 5,457,308 A | * | 10/1995 | Spitz et al. | 235/462.12 |
| 5,481,097 A | * | 1/1996 | Tafoya | 235/462.12 |
| 5,493,108 A | * | 2/1996 | Cherry et al. | 235/462.12 |
| 5,495,097 A | * | 2/1996 | Katz et al. | 235/462.12 |
| 5,798,510 A | * | 8/1998 | Watanabe et al. | 235/462.25 |
| 5,821,519 A | * | 10/1998 | Lee et al. | 235/462.27 |
| 5,979,763 A | * | 11/1999 | Wang et al. | 235/462.17 |
| 6,267,293 B1 | * | 7/2001 | Dwinell et al. | 235/462.12 |
| 6,637,658 B2 | * | 10/2003 | Barber et al. | 235/462.45 |
| 6,651,889 B2 | * | 11/2003 | Belknap et al. | 235/462.4 |
| 2002/0121551 A1 | * | 9/2002 | De Renzis | 235/462.12 |
| 2002/0148899 A1 | * | 10/2002 | Brandt et al. | 235/462.12 |
| 2004/0182931 A1 | * | 9/2004 | Lapinski et al. | 235/462.12 |

* cited by examiner

*Primary Examiner*—Michael G. Lee
*Assistant Examiner*—Ali Sharifzada
(74) *Attorney, Agent, or Firm*—Priest & Goldstein PLLC

(57) ABSTRACT

Systems and techniques for stitching together partial bar code segments to construct and decode information for a complete bar code. As a scanner operates to generate a scan pattern, information is maintained that can be used to identify a scan line being generated when an event of interest occurs. When a scan signal indicates that a terminal delimiter of a bar code is included in a bar code segment that has been transected by a scan line, information is noted that can identify the scan line. Subsequent transections of the bar code by the same scan line are noted, and information for overlapping bar code segments is stored. When a segment is detected that includes a delimiter opposite the delimiter appearing in the original segment, the stored information is retrieved and used to assemble the complete bar code.

17 Claims, 4 Drawing Sheets

METHODS AND APPARATUS FOR IMPROVED USE OF PARTIAL BAR CODE INFORMATION TO DECODE A COMPLETE BAR CODE

FIELD OF THE INVENTION

The present invention relates generally to improvements to bar code recognition and decoding. More specifically, the invention relates to improved systems and techniques for stitching together information obtained from partial bar code scans in order to reconstruct a complete scan.

BACKGROUND OF THE INVENTION

Bar code scanning comprises the generation of a scan pattern consisting of one or more scan lines traced out by a reflection of a laser beam, the use of light scattered from a reflection of scan lines to create a scan signal, and the interpretation of the scan signal to detect and decode a bar code as the bar code is illuminated by scan lines. Scan lines emerge from a bar code scanner into a scan volume and intersect a bar code that is introduced into and moved through the scan volume. One or more scan lines typically sweep across the bar code. Typical retail scanners produce scan patterns comprising multiple scan lines traced out in a number of different directions. If scan lines are traced out in a number of directions, a bar code will have a greater likelihood of being intersected by one or more lines of the scan pattern.

Because scan lines are traced out in a number of directions, a significant likelihood exists that scan lines will sometimes partially transect a bar code, generating partial bar code information. Therefore, in order to provide for increased scanner efficiency and to avoid a need for an operator to always position a bar code so that it is fully transected by one scan line, scanners are typically capable of combining, or stitching together, multiple partial intersections. A partial intersection often produces sufficient data to decode several characters, and intersections producing sufficient characters for the technique being used, including a common character, can be stitched together.

A single character often comprises a significant number of light and dark elements. For example, in Code 39 bar codes, a character is represented by four light and five dark elements, with an intercharacter gap, similar to a light element, appearing between adjacent characters. If stitching adjacent Code 39 characters required a minimum of four characters in each segment, for example, the segment would be required to include at least 40 light and dark elements. Typical prior art stitching techniques are not able to use data elements making up less than a full character, so that elements on one or both sides of a string of full characters would not be usable.

In addition, misframing of data can cause inability to use data or misinterpretation of data, because if a scan line enters a bar code in the middle of a character, there is no delimiter to indicate where the entry occurred. Moreover, noise, for example, electrical noise or signals generated by an intersection of scan lines with package graphics, may generate extraneous data that can be misinterpreted as bar code data, and be mistakenly combined with bar code data generated by a partial scan, leading to failure to stitch segments or to a misread.

SUMMARY OF THE INVENTION

The present invention addresses such problems, as well as others, by using timing or other data to identify scan lines producing partial scans that are candidates for stitching. If partial transections of a bar code by a scan line are detected, and no full transection is detected, an attempt is made to use the same scan line to generate partial scans whose data is to be stitched together to produce a complete decoding of a bar code. In addition, the data used to identify a particular scan line can also identify a time window during which valid data is to be expected, allowing for a more reliable rejection of noise.

When data is received from a scan of a bar code segment, information associated with the data segment is identified. The associated information includes information such as timing or spinner position information for the scan line that produced the data. The same scan line is produced by successive rotations of a spinner when the spinner reaches the same rotational position, and information such as a timestamp, or, alternatively, direct sensing of a spinner position, may be used to indicate a spinner position.

Light and dark elements are evaluated, suitably by evaluating their widths, in order to determine if a delimiting character indicating the beginning or end of a bar code appears in the segment, and information indicating spinner position, such as a timestamp, is associated with the segment. If such a segment appears, the width values of all light and dark elements from the segment are saved for later use. As information for a subsequent bar code segment is received, the associated spinner rotation or timing information is evaluated to determine if the bar code segment was produced by the same scan line. When a bar code segment appears that was produced by the same scan line as the original segment, the segment is again examined.

If the same delimiter appears, and the segment is longer than the previously stored segment, the new segment replaces the previous segment. If a delimiter character does not appear, the new segment is scanned and the element widths of the first segment and the next segment are examined to determine if an overlap between segments exists. An overlap exists if at least a predetermined number of elements belonging to the end of the first segment in the direction of the scan match elements belonging to the beginning of the second segment. If a sufficient number of element widths match, indicating that a reliable overlap exists, the combined element widths from the old and new scans are stored, suitably in an elements memory, which may be a portion of short term memory used to store information for partial scans. This process continues until a segment is detected that includes an appropriate delimiter character. If the first segment stored in the elements memory was a start character, the last expected segment will be one including an end character, and if the first segment stored includes an end character, the last expected segment will be one including a stalt character. At this point, information for a succession of overlapping segments will be present in the elements memory and can be stitched together to form information for a complete bar code, with each segment having been produced by an intersection of the same scan line with the bar code.

If a segment is detected that does not include a sufficient number of overlapping elements with the previous segment, the attempt is considered to have failed and the contents of the elements memory are discarded, so that a new attempt may be made to stitch together a bar code, beginning with the first detected segment including a delimiting character.

It may not always be possible or efficient to use data from only a single scan line to produce bar code information. Therefore, a maximum allowable number of failures may be designated, and if this number is reached, stitching may be allowed using multiple scan lines.

A more complete understanding of the present invention, as well as further features and advantages of the invention, will be apparent from the following Detailed Description and the accompanying drawings.

DETAILED DESCRIPTION

Figure 1:
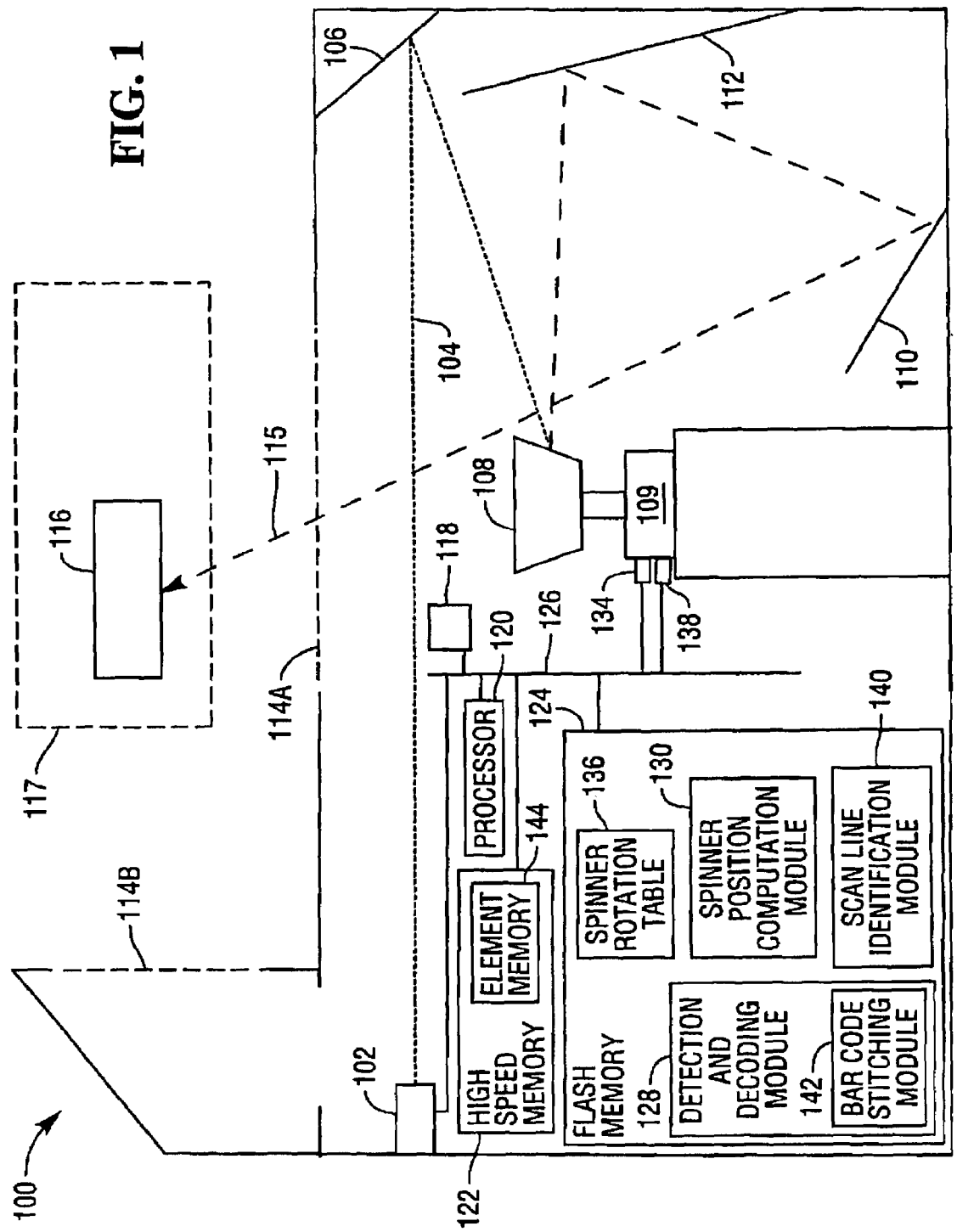
FIG. 1 illustrates a bar code scanner according to an aspect of the present invention.

FIG. 1 illustrates a bar code scanner 100 according to an aspect of the present invention. The scanner 100 comprises a collection of optical components for generating a scan pattern. The collection of optical components includes a laser 102 emitting a laser beam 104. The laser beam 104 is directed to a deflector mirror 106 and is reflected to strike a rotating polygonal spinner 108, which is rotated by a spinner motor 109. The scanner 100 includes a set of primary mirrors of which a primary mirror 110 is illustrated here, as well as a set of secondary mirrors of which a secondary mirror 112 is illustrated here. While the present exemplary scanner 100 includes primary and secondary mirrors, it will be recognized that this specific configuration is not required and that the present invention may be practiced using scanners employing any desired technique for producing scan patterns, such as the use of only primary mirrors in addition to a spinner, or the generation of scan patterns using a spinner alone without any fixed mirrors.

Once the laser beam 104 is reflected from the spinner 108, it is directed to one of the primary mirrors and from there to one of the secondary mirrors. Once the laser beam 104 is on its final path out of the scanner 100, it is conveniently called a scan beam, and is directed to and out of one of the scan windows 114A or 114B. Here, a scan beam 115 is shown, emerging from the scan window 114A to strike an object 116 in a scan zone 117. As the spinner 108 rotates, the angle of reflection of the laser beam 104 from the spinner 108 changes, causing the scan beam 115 to move. The rotation of the spinner 108 causes the scan beam 115 to move across the scan window 114A, causing it to trace out scan lines. In addition, the rotation of the spinner 108 and the change of the spinner facet from which the laser beam 104 is reflected causes the path traveled by the laser beam 104 to change, so that the laser beam 104 is reflected from different sets of primary and secondary mirrors, generating numerous different scan beams emerging from the scan windows 114A and 114B. During each rotation of the spinner 108, a scan pattern emerges from each of the scan windows 114A and 114B, each scan pattern being created through the tracing out of a plurality of scan lines emerging from the scan window. For the sake of simplicity, scan beams other than the scan beam 115 are not shown here, but in a typical embodiment, they will emerge from their respective scan windows 114A and 114B and trace out scan patterns comprising scan lines traced out in a number of different directions.

Different scan lines will be generated as the spinner 10S rotates, and each scan line will be produced as the spinner 108 travels through the same range during each of its rotations. For example, a scan line may be produced as the spinner travels from a displacement of 10 degrees to a displacement of 20 degrees from a reference point, and when the spinner completes its rotation and then travels through the same range of displacement, the same scan line will be produced again. By detecting or otherwise noting the angular position of the spinner 108, and correlating this angular position with detection of bar code segments, it is possible to identify the scan line that transected a bar code segment, and to limit examination to segments associated with the same scan line as it appears through successive rotations of the spinner 108.

In order to produce an electrical signal that can be interpreted in order to detect and encode a bar code, the scanner 100 includes a photodetector 118. The photodetector 118 produces an electrical signal, suitably referred to as a scan signal, when struck by light. The scan signal is processed to extract bar code information from light resulting from the reflection of a scan pattern from a bar code into one of the scan windows 114A or 11413 and back to the photodetector 118. For example, the photodetector produces a signal when struck by light directed into the scan window 114A when the scan beam 115 strikes an object in the scan volume 117 outside the scan window 114A.

The scanner 100 suitably includes data processing resources in order to control the operation of the scanner 100, such as generation of scan patterns and processing of light reflected back into the scanner 100. The data processing resources include a processor 120, high speed memory 122, and relatively long term memory such as flash memory 124, communicating with one another and with various elements of the scanner 100 through a bus 126. The scanner 100 may suitably utilize various modules to control generation of scan patterns and processing of reflected light to decode bar codes. These modules may be implemented as software hosted in the flash memory 124 and transferred to high speed memory 122 as needed for execution by the processor 120.

Of particular interest is a detection and decoding module 128, which detects and decodes bar codes introduced into scan volumes outside each of the scan windows 114A and 114B. The detection and decoding module 128 interprets the scan signal to identify light and dark segments of a bar code and to interpret sequences of light and dark segments as representing informational characters and delimiters. The scan signal represents transections of the bar code from a number of different directions, because the scan pattern produced by the scanner 100 preferably comprises scan lines oriented in different directions, in order to provide a greater likelihood of intersecting a bar code. The detection and decoding module 128 can detect and decode full transections of a bar code, and can also detect and decode partial transections and combine, or stitch, partial transections together to obtain complete bar code information. In order to improve accuracy and efficiency of stitching together bar code segments detected upon a partial transection of a bar code by a scan line, the detection and decoding module 128 employs spinner position information indicating the rotational position of the spinner 108 to identify data segments transected by a particular scan line.

When the detection and decoding module 128 receives information indicating a full or partial transection of a bar code, the time at which detection occurred is noted. The time information may be supplied to a spinner position computation module 130, which may use timing and other information to compute the position of the spinner 108 at points of interest.

The spinner rotation information may be provided by a sensor signal, such as a signal from a Hall sensor 134, connected to the motor 109 used to rotate the spinner 108. The information from the Hall sensor 134 may suitably be examined to determine when the spinner 108 is in a predetermined reference position and then timing information may be used to determine the position of the spinner 108 throughout its rotation. A spinner rotation table 136 may be stored in the flash memory 124, providing a cross reference between rotation timing and spinner position, with rotation timing suitably being expressed in fractions of the time required for a complete rotation of the spinner. A clock 138 may be used to provide rotation time information, with the clock 138 being reset whenever the spinner 108 is in the reference position. At any time of interest, the time indicated by the clock 138 may be noted and the spinner position computation module 130 may consult the spinner rotation table 136 to determine the position of the spinner 108.

As an alternative to use of a Hall sensor, other sensing techniques may be used to determine when the spinner 108 is in a reference position. For example, a synchronization label may be read to determine a reference position of the spinner 108 and then timing information can be utilized to determine the displacement of the spinner from the reference position in a known manner. Details of such use of a synchronization label are disclosed in U.S. Pat. No. 6,220,513 and U.S. Pat. No. 6,347,741, both of which are assigned to the assignee of the present invention and incorporated herein by reference in their entirety.

Alternatively, a scanner may employ a diffractive element to diffract a laser beam reflected from a spinner such as the spinner 108 when the spinner is in a reference position, such that the diffracted beam strikes a reference position photodetector to produce a reference position photosignal used to calibrate the position of the spinner. Details of determination of a spinner position using a photosignal produced by a diffracted beam are disclosed in U.S. Pat. No. 6,454,169, assigned to the assignee of the present invention and incorporated herein by reference in its entirety.

As an alternative, if the Hall sensor 134 is able to identify the position of the spinner 108 with sufficient precision throughout its rotation, the information provided by the Hall sensor 134 can be used to determine the position of the spinner 108 throughout its rotation.

However the position of the spinner 108 is determined, the spinner position computation module 130 may suitably monitor the position of the spinner 108, receiving timing information from the detection and decoding module 128 indicating when an event of interest occurs, and supplying appropriate spinner position information based on this timing information. Suitably, the spinner position information may be provided to a scan line identification module 140, which receives spinner position information from the spinner position computation module 130 and identifies a scan line being generated when the spinner 108 is in the indicated position. The scan line identification module 140 may then supply scan line identification information to the detection and decoding module 128, indicating what scan line was being generated at the time of interest indicated by the detection and decoding module 128.

Numerous alternatives exist for determining the scan line being generated at a time of interest. The detection and decoding module 128 may attempt to stitch together partial bar code segments transected by the same scan line on successive spinner revolutions, so the detection and decoding module 128 may, for example, simply have access to timing information indicating the time since the spinner 108 has passed a reference point, and use this timing information as a timestamp for each detection. The detection and decoding module 128 then identifies detections associated with timestamps that are identical or within a predetermined tolerance as being generated by the same scan line.

The detection and decoding module 128 may include a bar code stitching module 142, that identifies and stores detected bar code segments that are candidates for stitching into a complete bar code. The bar code stitching module 142 identifies a succession of bar code segments, beginning with a segment including a delimiter. The delimiter may be either a start delimiter or an end delimiter. The bar code stitching module 142 may continue through a progression of overlapping bar code segments, ending upon detection of a bar code segment including a delimiter that is the opposite of the delimiter included in the first detected segment. For example, if the delimiter appearing in the first segment stored is a beginning delimiter, the process is completed when a segment is detected including an ending delimiter, and vice versa.

The bar code stitching module 142 initially restricts stitching candidates to bar code segments transected by the same scan line. If a predetermined number of failed attempts occurs, a predetermined time passes without a successful detection or stitching, or some other condition occurs indicating that stitching is not being conducted efficiently by restricting candidates to segments transected by the same scan line, the bar code stitching module 142 allows candidates resulting from transection by multiple scan lines. If a complete transection of a bar code is detected at any point in an attempt to stitch together segments of the bar code, the bar code stitching module 142 may abandon attempts to stitch the segments together, and instead use the data produced by the complete transection of the bar code.

When a segment is detected that is a candidate to begin the stitching process for a bar code, the segment is stored in an element memory 144. The values associated with the bar code segment typically represent width values for light and dark elements of the segment.

Once the values associated with the segment have been detected and stored, the detection and decoding module 128 supplies information about additional segments to the bar code stitching module 142, including the values associated with the segment and information identifying the scan line associated with the segment. For example, the detection and decoding module 128 may use the scan line identification module 140 to generate scan line identification information, and provide a scan line identifier along with the information for the segment to the bar code stitching module 142. Alternatively, spinner position or timing information may be supplied to the bar code stitching module 142, in order to allow for identification of a scan line.

The bar code stitching module 142 rejects bar code segments that are not associated with the scan line that transected the initial bar code segment. When the bar code stitching module 142 receives a new bar code segment associated with the same scan line that transected the beginning bar code segment, it first examines the segment to determine if it includes the same delimiting character as the initial segment. If so, and if the new segment is longer than the initial segment, the new segment replaces the previous segment in the element memory 144.

If the new segment does not include the same delimiting character as the initial segment, the new segment is examined in the same direction as the scan of the initial segment. For example, if the delimiting character appeared at the left of the scan, the scan beam is moving from left to right, and the elements of the new segment are examined from left to right. If the delimiting character appeared at the right of the scan, the scan beam is moving from right to left, and the elements of the new segment are examined from right to left. The new segment is examined for elements overlapping the previous segment. For example, if the examination proceeds from left to right, the new segment is examined to determine if elements at the left of the new segment match elements at the right of the previous segment. If the number of overlapping elements meets a predetermined threshold, the values for the new segment are stored in the element memory 144. The threshold for the number of elements that are required to match for a successful overlap is suitably programmable. The number of required elements may be chosen based upon a desire to balance aspects of the scan operation. If a higher number of matching elements is required to recognize an overlap, the stitching operation is more reliable. However, the more elements are required for an overlap, the less omnidirectional a bar code scanning operation becomes. The number of elements required for an overlap may be chosen based on a balancing between reliability of stitching and omnidirectionality of scanning, and may be chosen based on estimates as to which number will give a desired scanner performance, and may also be chosen or changed on experimentation with a scanner operation or experience as use of a scanner proceeds.

The detection and decoding module 128 continues detecting bar code segments, with candidate segments being limited to those identified with the same scan line that transected the initial bar code segments. As each new bar code segment overlaps with the previous one, the element values for the new segment are stored in the element memory 144. This procedure continues until a segment is detected including a delimiter that is the opposite of the delimiter included in the initial segment. Detection of this delimiter indicates that sufficient overlapping elements are stored in the element memory to allow reconstruction of the complete bar code.

If a continuous chain of overlapping segments cannot be completed, the element memory 144 is cleared and a new attempt may be made to construct a chain of overlapping segments. If a segment is detected that fails to overlap with a previous segment, this may be taken as an indication that the attempt to complete the chain has failed. If desired, the scanner 100 may be designed so that a predetermined number of additional attempts may be made to detect a new overlapping segment. Once a failure to complete the chain has been recognized and the element memory 144 is cleared, the bar code stitching module 142 awaits detection of a new segment including a delimiter. The bar code stitching module 142 then proceeds as described above, attempting to construct a bar code by detecting a chain of overlapping segments.

Once a chain has been successfully constructed, the complete bar code is reconstructed, suitably by conventional means. This includes retrieving element values for each element from each segment from the element memory 144, deleting overlapping elements from one of the segments in which they appear, concatenating the element values and decoding the element values to yield characters. The decoded characters are then used as desired. For example, the decoded bar code, comprising a string of characters, may be transferred to a point of sale terminal and used by the point of sale terminal as an index for retrieval of product and pricing information for entry into a retail transaction.

Figure 2A:
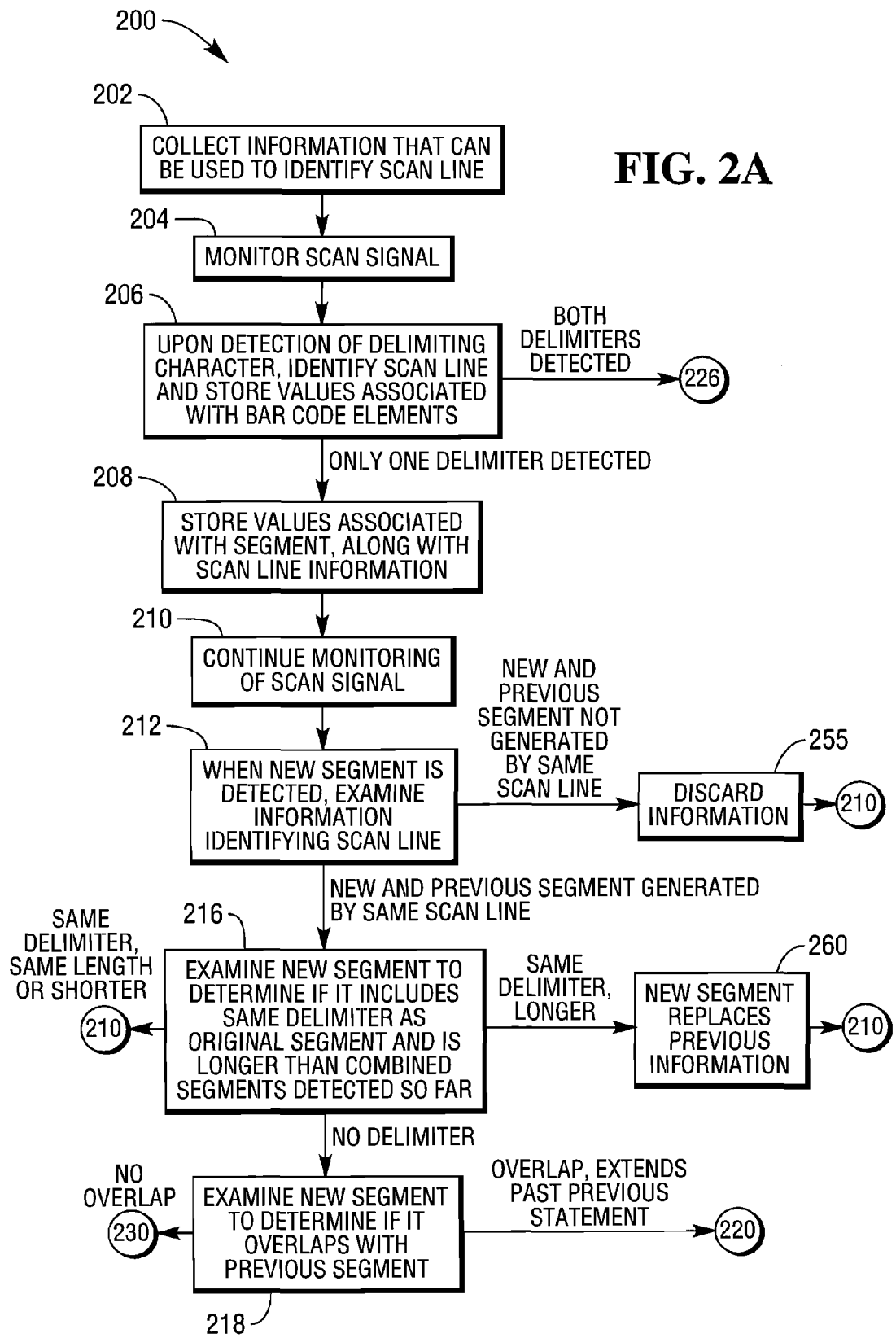
FIGS. 2A-2C illustrate a process of bar code detection and decoding according to an aspect of the present invention.
Figure 2B:
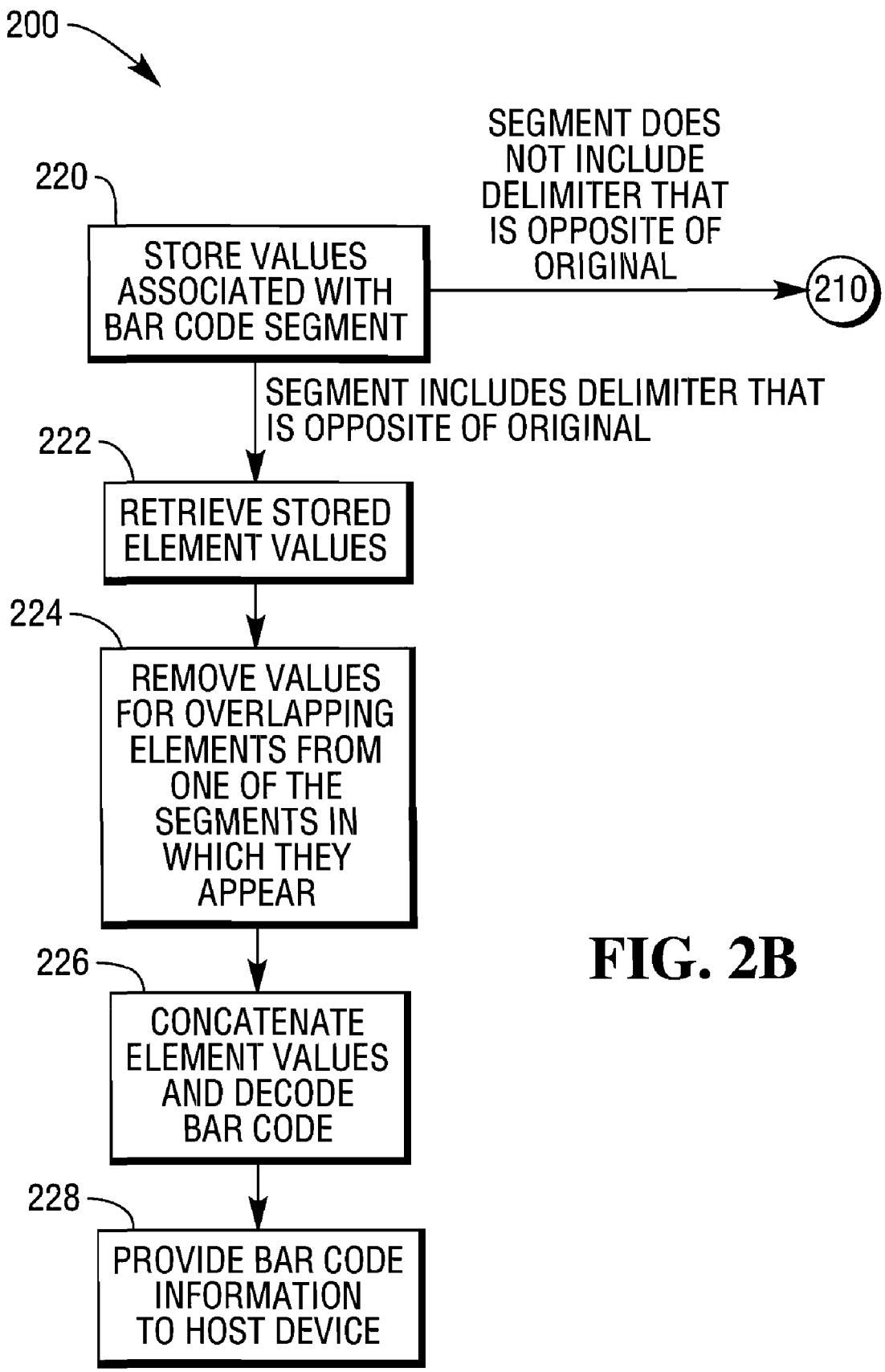
Figure 2C:
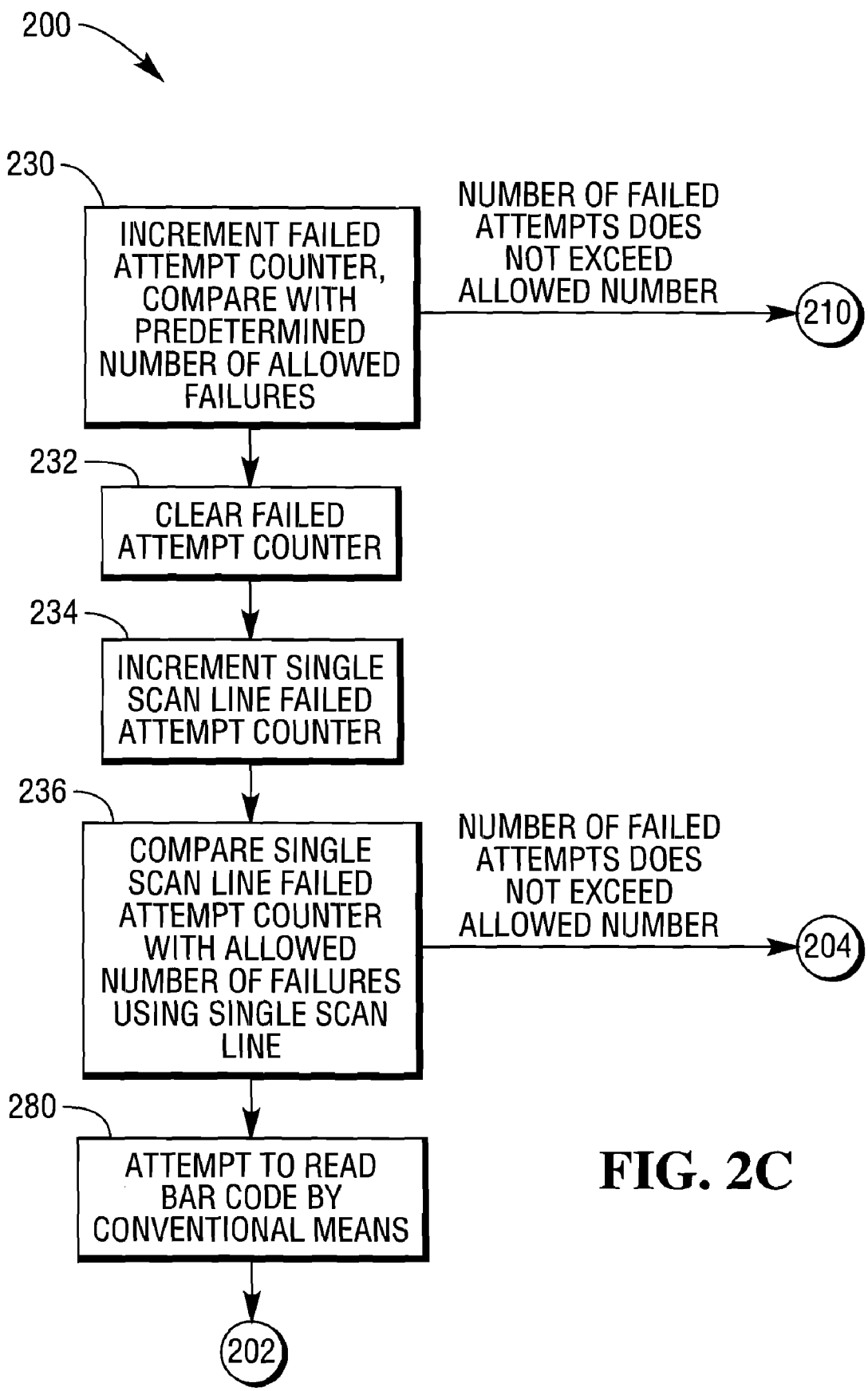

FIGS. 2A-2C illustrate a process 200 of bar code scanning according to an aspect of the present invention. The process 200 may suitably be carried out using a scanner such as the scanner 100 of FIG. 1. At step 202, as a rotating spinner rotates in the path of a laser beam, information is collected that can be used to identify the scan line being generated by the scanner. This information may suitably include direct information relating to the spinner position, or timing information that can be used to determine the spinner position. The spinner position naturally correlates to the scan line being produced, because the scan lines making up a scan pattern are produced by rotation of facets of the spinner through particular angular displacements in the path of the laser beam. At step 204, a scan signal produced by detection of light entering the scanner as a result of scattering of a scan line from a bar code is monitored. When a bar code is being transected by a scan line, the scan signal typically exhibits variations, such as positive and negative peaks, indicating transitions between light and dark elements of the bar code. As the scan signal is monitored, information is maintained indicating the scan line producing the scan signal. The scan signal indicates the transection of bar code segments by a scan line. A bar code segment may represent a complete transection, from a beginning delimiter to an ending delimiter, or a partial transection. A bar code segment representing a partial transection may or may not include a delimiting character. A complete bar code may be stitched together by a chain of bar code segments representing partial transections. The segments representing partial transactions include overlapping elements, and a partial segment following another partial segment in the same bar code can be identified by the presence of the same elements in both segments. For example, if a scan is proceeding from left to right, the presence of a predetermined number of matching elements at the right of one segment and at the left of the next segment indicates an overlap.

At step 206, when a delimiting character of a bar code is detected, the scan signal is examined to determine if the bar code segment producing the signal includes beginning and ending delimiters. If the bar code segment includes both beginning and ending delimiters, the segment includes a complete bar code and the process skips to step 226, described further below, in order to decode and use the bar code.

If the bar code segment does not include both beginning and ending delimiters, the process proceeds to step 208, and values associated with the elements comprising the segment, such as element width values are stored, along with information indicating which scan line transected the segment. At step 210, monitoring of the scan signal continues. At step 212, when a new bar code segment is detected, information identifying the scan line transecting the segment is examined. This information may be a direct indication of the scan line, timing information, scanner position information, or other information that can be matched between bar code segment detections to indicate that the same scan line generated the bar code detections. If the new segment and the previous segment were not generated by the same scan line, the process skips to step 255 and the segment information is discarded. The process then returns to step 210.

If the new segment and the previous segment were generated by the same scan line, the process proceeds to step 216. At step 216, the new segment is examined to determine if it includes the same delimiting character as the original segment and is longer than the combined length of the segments that have been detected so far. If the new segment includes the same delimiting character and is the same length as or shorter than the combined segments, the process returns to step 210. If the new segment includes the same delimiting character and is longer than the combined segments, the process skips to step 260 and information for the new segment replaces the assembled information for the previously detected segments. The process then returns to step 210. If the new segment does not include the same delimiting character, the process proceeds to step 218.

At step 218, the new segment is examined to determine if it overlaps with the previous segment. If at least a predetermined number of elements of the previous segment and the new segment match, and the new segment extends past the previous segment in the direction in which construction of the chain is proceeding, the process proceeds to step 220 and width values associated with the new segment are stored. As an example, if the scan is proceeding from left to right, the new segment should include at its left side at least a predetermined number of elements matching elements at the right side of the previous segment, as well as new elements at its right side that are not included in the previous segment. Once the width values for the new segment have been stored, the process returns to step 210 if the new segment does not include a delimiting character that is the opposite of the delimiting character for the original segment. If the new segment includes a delimiting character that is the opposite of the delimiting character for the original segment, the process proceeds to step 222.

At step 222, the stored element width values are retrieved for use in decoding the bar code. At step 224, values for elements that overlap between two segments are removed from the information for one of the segments. For example, if the same element width values appear at the right side of one segment and at the left side of the segment immediately following so that an overlap is established, those values may be removed from the information for the following segment, because the multiple appearance of the same elements results from repeated transections of a scan line. At step 226, the width values for all segments are concatenated and used in decoding of the complete bar code. At step 228, the bar code information may be provided to a host device, such as a point of sale terminal.

Returning now to step 218, if a new segment does not overlap the previous segment, an evaluation may be performed in order to determine whether the attempt to construct a chain of bar code segments has failed. In order to begin such an evaluation, the process skips to step 230. Suitably, at step 230, a failed attempt counter may be incremented and then compared with a predetermined number of allowed failures. The predetermined number may be 0, if a failure is to be declared after one failed attempt, or some other number indicating the number of failed attempts to be permitted before the attempt to construct the chain is abandoned. If the number of failed attempts does not exceed the number of allowed failures, the process returns to step 210. If the number of failed attempts exceeds the number of allowed failures, the process proceeds to step 232 and the failed attempt counter is cleared.

The process then proceeds to step 234 and a single scan line failed attempt counter is incremented. The process then proceeds to step 236 and the single scan line failed attempt counter is compared with a predetermined value indicating the allowed number of failures before the attempt to read the bar code using a single scan line is abandoned and attempts allowing the use of multiple scan lines are permitted. If the counter does not exceed the predetermined value, the process returns to step 204 in order to allow for a new attempt to read the bar code, allowing for transection of the bar code by a new scan line, with the bar code segments that are permitted being limited to those transected by the same scan line that transects the initial bar code segment. If the single scan line failed attempt counter exceeds the allowed number of failures, the process proceeds to step 280 and an attempt is made to read the bar code by conventional means, allowing for bar code segments transected by any scan line to be considered for use in constructing a chain. Once the attempt is successful, the process may return to step 202 in order to read a new bar code.

While the present invention is disclosed in the context of aspects of presently preferred embodiments, it will be recognized that a wide variety of implementations may be employed by persons of ordinary skill in the art consistent with the above discussion and the claims which follow below.

I claim:

1. A bar code scanner, comprising:
    a collection of optical components for generating a scan pattern comprising a plurality of scan lines, each of the plurality of scan lines being traced by a scan beam that moves as a rotating spinner rotates in the path of a laser beam from a starting rotational position associated with the start of the scan line to an ending rotational position associated with the end of the scan line, each of the plurality of the scan lines being associated with starting and ending rotational positions of the spinner differing from those associated with the other scan lines of the scan pattern; and
    a detection and decoding module for using light scattered from a bar code by transection of the bar code by a scan line to decode the bar code, the detection and decoding module being operative to assemble bar code information representing multiple partial transections of the bar code by the scan line, the detection and decoding module being operative to receive information identifying a scan line transecting the bar code and to assemble bar code information representing successive partial transections of the bar code by repeated occurrences of the same scan line of the plurality of scan lines as the repeated occurrences of the same scan line are generated by repeated sequential rotations of the spinner from the same starting rotational position to the same ending rotational position, in order to collect and assemble the bar code information.

2. The bar code scanner of claim 1, wherein the detection and decoding module receives spinner position information identifying the scan line.

3. The bar code scanner of claim 2, wherein the spinner position information includes timing information indicating the time elapsed since the spinner was at a reference position.

4. The bar code scanner of claim 1, wherein the detection and decoding module assembles information for successive bar code segments representing successive partial transections of the bar code by a scan line, and wherein the detection and decoding module stores element width values representing widths of light and dark elements of each bar code, in order to assemble a chain of successive overlapping bar code segments.

5. The bar code scanner of claim 4, wherein the detection and decoding module recognizes a succeeding bar code segment as overlapping with an immediately preceding bar code segment if at least a predetermined number of matching element values appear at the end of the preceding bar code segment and the beginning of the succeeding bar code segment.

6. The bar code scanner of claim 5, wherein the detection and decoding module is able to recognize an overlap between bar code segments without a need for a complete shared character between the preceding bar code segment and the succeeding bar code segment.

7. The bar code scanner of claim 5, wherein the required number of matching elements in a preceding and a succeeding segment is programmable.

8. The bar code scanner of claim 5, wherein the detection and decoding module receives information for an initial bar code segment including a delimiting character, notes information identifying a scan line transecting the initial bar code segment, and receives and assembles information for successive bar code segments transected by the same scan line as the initial bar code segment.

9. The bar code scanner of claim 8, wherein the detection and decoding module evaluates the bar code segments that are received in order to determine whether an attempt to construct a continuous chain of overlapping segments has failed.

10. The bar code scanner of claim 9, wherein the detection and decoding module, after determination that an attempt to construct a continuous chain of overlapping segments has failed, monitors a scan signal for information indicating a transection of an initial bar code segment and begins a new attempt to construct a continuous chain of overlapping bar code segments transected by a single scan line, with the scan line allowed to be a different scan line than that used to provide the information for the previous failed attempt.

11. A method of detecting and decoding a bar code, comprising the steps of:

monitoring a scan signal generated by the detection of light scattered from a scan pattern comprising a plurality of scan lines as the scan lines illuminate a bar code, each of the plurality of scan lines being traced by a scan beam reflected from a rotating spinner as the spinner rotates from a starting rotational position associated with the start of the scan line to an ending rotational position associated with the end of the scan line, each of the plurality of the scan lines being associated with starting and ending rotational positions of the spinner differing from those associated with the other scan lines of the scan pattern;

maintaining information identifying scan line being generated at a time of interest;

receiving information related to bar code segments comprising complete or partial transections of the bar code by a scan line;

identifying the scan line being generated as the information relating to each bar code segment is detected;

assembling bar code information associated with one complete transection of the bar code, or a succession of partial bar code segments generated by a succession of transections of the bar code by repeated occurrences of the same scan line of the plurality of scan lines, generated repeatedly as the spinner repeatedly rotates from the starting rotational position associated with the scan line to the ending rotational position associated with the scan line; and decoding the assembled bar code information.

12. The method of claim 11, wherein the step of assembling the bar code information includes identifying an initial bar code segment including a delimiting character and receiving and storing element information for a succession of overlapping bar code segments until information for the complete bar code has been assembled.

13. The method of claim 12, wherein the information for the complete bar code is determined to have been assembled when information has been received and stored for a bar code segment including a delimiter that is the opposite of the delimiter appearing in the initial bar code segment.

14. The method of claim 13, wherein an overlap between a preceding bar code segment and a succeeding bar code segment is identified if a predetermined number of element values match between the end of the preceding bar code segment and the beginning of the succeeding bar code segment.

15. The method of claim 14, wherein an overlap between a preceding and a succeeding segment can be identified even if the overlapping portions of the preceding and succeeding segment comprise less than a complete character.

16. The method of claim 12, including a step of determining whether a new bar code segment detected subsequent to detection of the initial segment includes the same delimiting character as does the initial segment and is longer than the initial segment, and, if so, replacing the information for the initial segment with the information for the new segment.

17. The method of claim 12, including a step of identifying a failure to assemble information for a complete bar code if a bar code segment failing to overlap a preceding segment is detected during a predetermined number of attempts.

* * * * *